United States Patent [19]
Bessacini

[11] Patent Number: 5,319,556
[45] Date of Patent: Jun. 7, 1994

[54] ADAPTIVE TRAJECTORY SELECTION APPARATUS AND METHOD

[75] Inventor: Anthony F. Bessacini, Narragansett, R.I.

[73] Assignee: The United States of America as represented by the Secretary of the Navy, Washington, D.C.

[21] Appl. No.: 991,550

[22] Filed: Dec. 11, 1992

[51] Int. Cl.$^5$ .................. G06F 7/70; G06G 7/76; G01S 13/00

[52] U.S. Cl. .................. 364/424.01; 364/424.02; 364/432; 364/516; 114/316; 114/238; 89/1.810; 89/1.802; 89/1.8

[58] Field of Search .................. 364/424.01, 424.02, 364/424.03, 424.04, 474.15, 474.16, 474.17, 474.18, 474.19, 432, 516; 395/900, 901, 902, 903, 904, 905, 906, 50-55, 60-61; 235/400, 403

[56] References Cited

U.S. PATENT DOCUMENTS

| | | | |
|---|---|---|---|
| 4,046,993 | 9/1977 | Wilson et al. | 89/1.5 |
| 4,205,379 | 5/1980 | Fox et al. | 364/432 |
| 4,530,237 | 7/1985 | Barriac | 73/178 |
| 4,769,773 | 9/1988 | Shatto, Jr. | 364/424.01 |
| 5,047,990 | 10/1991 | Gafos et al. | 367/118 |
| 5,050,523 | 9/1991 | Schwemin et al. | 114/259 |
| 5,051,751 | 9/1991 | Gray | 364/516 |
| 5,122,957 | 6/1992 | Hattori | 364/424.02 |
| 5,231,609 | 7/1993 | Gaer | 367/99 |
| 5,235,930 | 8/1993 | Pendleton | 114/312 |
| 5,283,575 | 1/1994 | Kao et al. | 340/990 |

Primary Examiner—Thomas G. Black
Assistant Examiner—Jacques Harold Louis-Jacques
Attorney, Agent, or Firm—Michael J. McGowan; Prithvi C. Lall; Michael F. Oglo

[57] ABSTRACT

An adaptive trajectory apparatus and method provide vehicle control commands to steer an underwater vehicle launched from a vessel towards a contact. A plurality of measured/estimated position and motion parameters associated with the contact are provided. The contact parameters also include information on quality and alertment status. The contact parameters are compared with an information matrix that defines a plurality of trajectory strategies and data parameters required to effect each of the trajectory strategies. A trajectory strategy is defined as a candidate trajectory strategy when the required data parameters are included in the measured/estimated contact parameter set. An expert system periodically selects a unique possible trajectory strategy based upon a predetermined set of rules that utilize the received contact parameters, quality thereof, contact alertment status and vehicle state information received from the underwater vehicle. The vehicle control commands are generated with a controller using the selected unique candidate trajectory strategy and the vehicle state information.

7 Claims, 3 Drawing Sheets

|  | BEARING RIDER | PURSUIT | INTERCEPT | OPTIMUM PURSUIT | ALTERED TARGET | UNMASKING |
|---|---|---|---|---|---|---|
| ALERTMENT STATUS |  |  |  |  | X |  |
| CONTACT SOLUTION STATISTICS |  |  |  | X | X |  |
| SPEED OF CONTACT |  |  | X |  | X |  |
| COURSE TO CONTACT |  |  | X |  | X |  |
| RANGE TO CONTACT |  | X | X | X | X |  |
| BEARING TO CONTACT | X | X | X | X | X | X |

FIG. 2

ADAPTIVE TRAJECTORY SELECTION APPARATUS AND METHOD

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION

(1) Field of the Invention

The present invention relates generally to the control of an underwater vehicle trajectory from a moving platform, and more particularly to an adaptive trajectory selection apparatus and method that continually determines, in real-time, the trajectory of an underwater vehicle in order to effectively guide it to a desired area. Improved guidance is provided, in accordance with a given set of goals, through the innovative combination and extension of technologies and techniques from the fields of guidance and control, data management and expert systems.

(2) Description of the Prior Art

Present submarine combat control systems require an operator to select a single mode (trajectory) for post-launch guidance of an underwater vehicle, such as a torpedo. The post-launch guidance problem is that phase of vehicle/torpedo guidance whereby commands are sent over a communication system in order to guide the vehicle to the vicinity of a contact or target. In the case of a torpedo, effective guidance to the vicinity of the target will result in the torpedo's internal homing system detecting the contact (acquisition) and then beginning to autonomously seek it. Present systems cease any further vehicle control beyond acquisition.

Information on the contact is provided by sensors on the launching vessel. This data in conjunction with vessel navigational parameters, environmental and historical data is processed in order to provide estimates of contact state (position and velocity) along with indications of the quality of these estimates. The amount of either measured or estimated information available on a particular contact at any given time depends on many tactical and environmental factors. In present systems, a system operator monitors the system in order to determine what information is present and then selects a guidance mode when the torpedo is launched. At present, the modes from which the operator makes a choice for the post-launch guidance phase include: bearing rider, pursuit and intercept. A brief description of the characteristics of these trajectories follows.

Bearing rider is a mode whereby the vehicle or a point in front of the vehicle (associated with the acoustic homing system) is controlled so as to remain on the bearing between the firing platform and the contact. Pursuit is a trajectory in which the heading of the vehicle is controlled so as to always point at the contact. The intercept trajectory requires that the course of the vehicle be computed so that the vehicle will collide with the contact, which is assumed to be non-maneuvering, at some time in the future Upon selection of one of these modes, error indications are computed in the combat systems and the operator uses his judgement to determine when and what commands should be issued over the communication link to the torpedo to follow the selected trajectory. The ability to compute the required torpedo orders for any particular trajectory is dependent on the information content of the state vector for the contact-of-interest.

Traditionally, the guidance mode of choice during tactical encounters has been intercept. The drawback of intercept guidance is the requirement for a complete target state solution, i.e. Range, Course, Speed and Bearing. More recently this form of guidance is becoming less effective as a result of increased contact capabilities. Improved contact sensor capabilities allow for earlier alertment to an incoming vehicle/threat, thereby allowing for contact evasive action. This makes it impossible for the launching platform's combat system to maintain the complete contact motion solution set necessary to employ intercept throughout the launch to acquisition phase of a tactical encounter. The resulting reduced solution set thus requires an alternate strategy that is more in accordance with the available information.

Although the situation may warrant it, the guidance mode selected is rarely, if ever, changed during a given torpedo run. Further, if the present torpedo trajectory interferes with the contact data being measured by the launching vessel, modifications to the trajectory would be desirable in order to support the ongoing contact location estimation process. Such interference results in the launching vessel's sensor(s) obtaining heavily biased contact measurement information. This heavily biased information can seriously effect the ability to determine effective corrections necessary to sustain any form of vehicle trajectory control. It can also mask the presence of a contact maneuver which could obviously have serious impact on the efficacy of the guidance mode being employed.

Current post-launch guidance requires a great deal of operator involvement. A more automated system which reduces operator involvement is sorely needed in order to effectively react to the increasingly complex tactical missions/scenarios. Future anti-submarine warfare (ASW) scenarios will involve multiple sensors and concurrent guidance of multiple vehicles including torpedoes, mobile mines, autonomous underwater vehicles (AUV) and mobile countermeasures. Thus, current systems do not provide for continuous, real-time, adaptive selection of vehicle strategies and the associated automatic guidance desired to effectively employ single and multiple vehicles in a changing tactical scenario.

SUMMARY OF THE INVENTION

Accordingly, it is an object of the present invention to provide a real-time apparatus and method for adaptively selecting a trajectory strategy for an underwater vehicle in order to effectively guide the vehicle to a desired area in accordance with a given set of desired goals.

Another object of the present invention is to provide an apparatus and method for continuously adapting and implementing a trajectory strategy for an underwater vehicle utilizing measured and estimated data about a contact being tracked by the underwater vehicle's launching platform.

A further object of the present invention is to provide a method and apparatus that automatically selects and implements a trajectory strategy in response to changing target state vector content and other changing tactical data.

Yet another object of the present invention is to provide a method and apparatus that automatically and continuously provides trajectory control that does not corrupt the bearing signal being measured by the launching platform sensor(s) and thereby allows for continuous effective contact state estimation.

Still another object of the present invention is to provide a method and apparatus that automatically and continuously selects and implements trajectory strategies for a plurality of underwater vehicles, each of which is enroute to a particular contact or a particular location.

Other objects and advantages of the present invention will become more obvious hereinafter in the specification and drawings.

In accordance with the present invention, an adaptive trajectory apparatus and method provide vehicle control commands to steer an underwater vehicle launched from a platform towards a contact. Interrogation means receive a plurality of position and motion parameters associated with the contact. Each contact parameter set includes information on each parameter's quality according to predetermined quality standards and alertment status. The received contact parameters are transformed using an information matrix that defines a plurality of trajectory strategies and data parameters required to effect each of the trajectory strategies. A trajectory strategy is defined as a candidate trajectory strategy when the required data parameters are included in the received contact data parameter set. An expert system periodically selects one candidate trajectory strategy based upon a predetermined set of rules that utilize the received measured and estimated parameters, quality thereof, alertment status and information received from the underwater vehicle. The information received from the underwater vehicle includes at least a position of the underwater vehicle. The vehicle control commands are generated with a controller using the selected candidate trajectory strategy and the information received from the underwater vehicle. The entire process (from interrogation to control) is continually repeated throughout the tactical encounter thereby resulting in a unique, multi-attribute/hybrid vehicle trajectory, i.e. one that is made up of any number of different guidance strategies.

BRIEF DESCRIPTION OF THE DRAWINGS(S)

Other objects, features and advantages of the present invention will become apparent upon reference to the following description of the preferred embodiments and to the drawings, wherein:

FIG. 2 is a representative example of an information matrix employed by the state machine used by the trajectory hypotheses unit of the present invention.

DESCRIPTION OF THE PREFERRED EMBODIMENTS(s)

Figure 1:
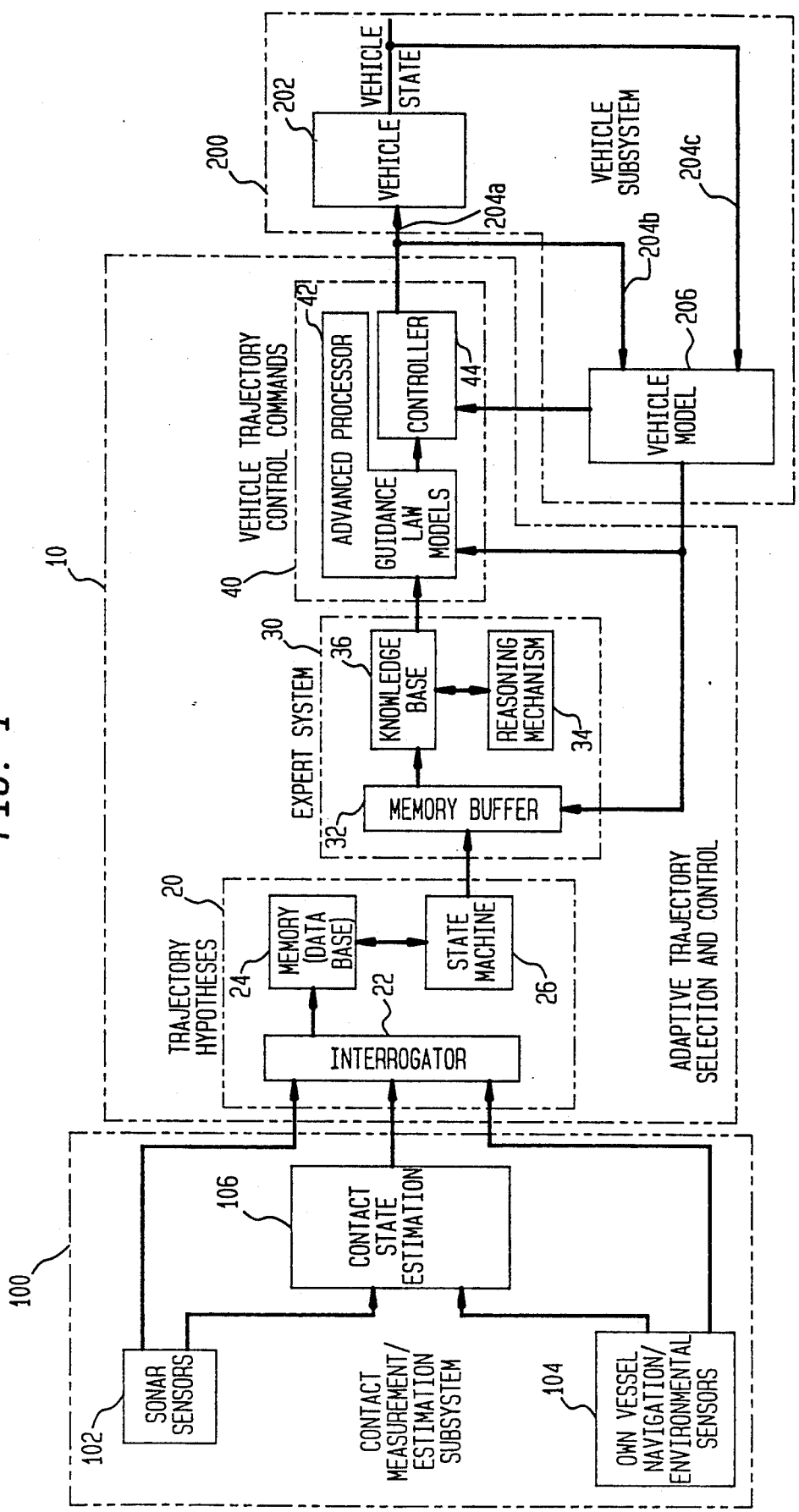
FIG. 1 is a block diagram of the adaptive trajectory selection and control apparatus of the present invention connected between an existing contact measurement/estimation subsystem and an existing vehicle subsystem.

Referring now to the drawings, and more particularly to FIG. 1, a block diagram is shown depicting the adaptive trajectory selection and control apparatus 10 of the present invention connected between a contact measurement/estimation subsystem 100 and an underwater vehicle subsystem 200. For purposes of description, contact measurement/estimation subsystem 100 and vehicle subsystem 200 comprise existing subsystems of a submarine combat system which is used to issue vehicle control commands to an underwater vehicle (torpedo) 202 over a communication link. However, as will be readily apparent to one skilled in the art, the present invention is equally applicable to the guidance and control of any autonomous underwater vehicle (AUV) being remotely steered towards a desired area.

The adaptive trajectory selection and control apparatus 10 continuously adapts the trajectory strategy of vehicle 202. That is, apparatus 10 automatically and continuously selects the guidance strategy and then determines and issues the vehicle control commands required to effectively place vehicle 202 in the desired vicinity in accordance with a given set of specified goals. These goals are implemented in the form of rules in an expert system unit 30 as will be explained further hereinbelow. Prior art methods require an operator to choose one of several guidance trajectories. The vehicle is then guided by the operator based on the chosen trajectory and a single error criteria which is visually displayed. In contrast, the present invention utilizes measured and estimated data about the contact, environmental and other tactical data, and vehicle sensed data to select the best strategy for the data available at any given time in order to better guide the vehicle during the post-launch guidance phase.

For sake of simplicity, the present invention will be described for a single vehicle launched towards a single contact. However, in practice, the present invention applies to multiple vehicles and multiple contacts. Accordingly, where appropriate, descriptions will be included as to how the present invention is extended to the multiple contact/vehicle situation. Contact measurement/estimation subsystem 100 is part of a combat control system maintained aboard the platform or vessel (not shown) that launches vehicle 202. Subsystem 100 includes sonar sensors 102 to provide measurements of parameters associated with the contacts-of-interest. Measured or raw data provided by sensors 102 may vary depending on the types of sensors employed, but typically will include at least bearing to the contact or bearing to the contact and range to the contact (all being measured with respect to the launching vessel).

Own vessel navigation/environmental sensors 104 are provided to measure various launching vessel parameters such as vessel heading, vessel speed and environmental parameters. The measured data from sonar sensors 102 and own vessel navigation/environmental sensors 104 is provided to a contact state estimation unit 106. A variety of well known submarine combat control techniques are applied in estimation unit 106 to process the measured data and to provide a contact state vector consisting of estimated contact parameters. An example of one is described in "Kalman Filter Behavior in Bearings Only Tracking Applications" by Vincent J. Aidala, IEEE Transactions on Aerospace and Electronic Systems, Volume AES-15, No. 1, January 1979. The measured data set and tactical situation (e.g., number of own vessel legs traversed, contact remains on same course at same speed, etc.) determine the completeness of the contact state vector. Accordingly, the contact state vector might include as much information as estimated bearing, range, course and speed of the contact or as little information as only estimated bearing to the contact.

Associated with each contact state vector is a performance data set, the elements of which provide a measure of quality for each parameter in the state vector and also an alertment status indicator. For example, associated with a state vector formed from sensor measurements (bearing, bearing and range) would be the associated variances which are obtained as a function of measured signal-to-noise. Alternatively, if the state vector came from a Kalman filtering estimation process, a covariance matrix would be used as an indicator of solution quality. For a more detailed description of 'quality', see N. Jackson, K.F. Gong and M. Graham, "Lower Bound Analysis for Large Error Nonlinear State Estimator", Proceedings of 22nd Asilomar Conference on Signals, Systems and Computers, November 1988. The alertment indicator is simply a status indicator as to whether or not a contact maneuver has been detected and is provided by the contact state estimation process.

As mentioned above, vehicle subsystem 200 exists as a portion of an existing submarine combat system. Subsystem 200 is comprised of a two-way communication link (represented by control lines 204a, 204b and 204c), a model 206 of the vehicle which resides aboard the launching vessel, and the vehicle 202. The vehicle model 206 simulates dynamic and logical behavior of a vehicle 202 in order to provide an estimate of vehicle kinematics (heading, speed, position) and status (e.g., acquired contact). These estimates are updated using information fed back from the vehicle via link 204c. Also, if communications link 204c is lost, the launching vessel would still be able to estimate the vehicle's behavior using model 206.

Two-way communications link 204a, 204b and 204c supports communication between the launching vessel and vehicle 202. A variety of control commands can be sent from the launching vessel to vehicle 202 via link 204a in order to modify the vehicle's state of operation. At the same time these commands are sent via link 204b to vehicle model 206 to be used in the vehicle state estimation process. Further, vehicle 202 has internal sensors (not shown) which determine its actual present state (e.g., position, speed, course, etc.), acoustic behavior and status which is transmitted to vehicle model 206 over link 204c. The present state information and status concerning vehicle 202 will be used by the present invention as will be explained further hereinbelow.

Adaptive trajectory selection and control apparatus 10 is comprised of a trajectory hypotheses unit 20, an expert system unit 30 and a vehicle trajectory control commands unit 40. Trajectory hypotheses unit 20 processes measured and estimated data (including the quality information and alertment status) to generate the possible trajectory strategies that could be used to guide vehicle 202. Toward this end, trajectory hypotheses unit 20 includes an interrogator 22, a memory (data base) 24 and a state machine 26.

Interrogator 22 polls the measured and estimated data from subsystem 100 to assess what parameters/combinations of parameters have been measured/estimated along with the performance data set that includes the quality associated with each parameter and the alertment status indicator. Interrogation is performed at continuous periodic rates that are based on contact measurement/estimation update rates. Reasonable periodic rates are once per second for the sensor measured data and once every twenty seconds for the estimated state data and the associated performance set. The parameters in the performance set which specify the quality of the raw and estimated data estimates are available from units 102 and 106, respectively. This data is available in either a numeric or symbolic form. With respect to trajectory strategies, the primary parameters of concern include bearing, range, course and speed to contact. The quality associated with each parameter can be specified/computed in symbolic/numeric fashion. For example, symbolic representation of quality might include the levels "excellent", "good", "fair", "poor", or "parameter quality not available". A simpler approach might limit the levels of quality to "good", "poor" or "parameter quality not available". Representations of quality, such as the well known covariance matrix which is an integral part of many of the state estimation techniques, provide more precise statistical data about the 'goodness' of a state estimate. In either case, the manner in which quality is obtained from units 102 and 106 will dictate what is used in the rules of the expert system unit 30, as will be explained further hereinbelow.

The parameters, along with their quality and alertment status (associated with the contact), are periodically stored in memory 24 as interrogator 22 polls subsystem 100. If a plurality of contacts are being tracked, memory 24 is a memory matrix for storing all data in terms of each contact of interest, and where the state variables came from (i.e. which sensor for raw data or which process for state estimated data). The contents of memory 24 are made available to a state machine 26.

State machine 26 could take the form of an information matrix which provides a plurality of candidate trajectory strategies and the various contact data required to be available in order to implement a particular strategy. By way of example, one such information matrix is shown in FIG. 2, where row designations are in terms of well known particular trajectory strategies and column designations are in terms of possible contact data (measured and/or estimated) that may be available from subsystem 100. Of the strategies listed in FIG. 2, Bearing Rider, Intercept and Pursuit have been previously described. Optimum pursuit is a strategy whereby the vehicle is pointed at the nearest point of an ellipse which is presumed to contain the contact. This ellipse is obtained through the utilization of the statistical information contained in the covariance matrix of a state estimator. Alerted target is a strategy that is used to attempt to acquire the target when it has been deemed that the target is alerted and evading. More than one of these types of strategies exist. Unmasking is a strategy whereby the angular separation between the contact bearing and the vehicle bearing is increased in order to prevent or eliminate interference of the contact signal by the vehicle. It is to be understood that this information matrix may include many additional strategies/contact data sets as required. Accordingly, a complete implementation of state machine 26 would require an entry in the information matrix for each strategy that was to be considered. A transformation example for the matrix of FIG. 2 is: if only bearing and range to contact are available with respect to the vessel, three trajectory strategies (namely, Bearing Rider, Pursuit and Unmasking) from the available trajectory strategies are recognized as possible or candidate trajectory strategies by state machine 26.

The candidate trajectories recognized by state machine 26 are inputs to expert system unit 30. The design and operation of expert systems are well documented in the art. See, for example, B.G. Buchanan and E.H. Shortliffe (editors), "Rule-Based Expert Systems—The MYCIN Experiments of the Stanford Heuristic Programming Project", Addison-Wesley, Reading, Mass., 1985; and A. Barr and E.A. Feigenbaum (editors), "The Handbook of Artificial Intelligence", Volume I & II, Addison-Wesley, Reading, Mass. Expert system unit 30 is comprised of three parts: (a) knowledge base unit 36; (b) memory or buffer-like structure unit 32; and (c) reasoning mechanism unit 34.

Knowledge base unit 36 is composed of a set of production rules. A production rule is defined as a statement of the form "If this 'condition' exists, then this 'action' is appropriate". Memory buffer unit 32 contains the information on the 'conditions' of the rule which are necessary for the rule to fire. Reasoning mechanism unit 34 is an interpreter which performs system management (i.e., decides which rule to fire next). Reasoning structures (e.g. forward/backward chaining) contained in unit 34 that control which rule to fire are well known in the prior art as taught by A. Barr and E.A. Feigenbaum (editors), "The Handbook of Artificial Intelligence", Volume I & II, Addison-Wesley, Reading, Mass.

The production rules in unit 36 include the conditions, priorities, limits and constraints that lead to the selection of the single "best" strategy from the candidate trajectories provided by the hypotheses unit 20. The type of information embedded in the rules reflects state-of-the-art post-launch trajectory strategies as well as information available from experienced operators. Prior interrogation of contact data in hypotheses unit 20 to select the candidate trajectories, rather than determine them in the expert system itself, reduces the rule set in knowledge base unit 36 and allows for hierarchical structuring of the individual rules. This structuring, together with 'a priori' partitioning of the knowledge base conditioned simply on types and number of vehicles to be employed, is a feature of the invention which allows rapid execution since only pertinent rules are considered. The information required in the condition portion of the rules, such as vehicle type, number deployed and other pertinent tactical data is available from the combat control system via memory buffer unit 32.

Simple sets of rules are given to illustrate both the partitioning and hierarchical structuring of the knowledge base as well as examples of the types of rules that are required to select a unique strategy. However, it is to be understood that this is not an exhaustive set, but simply an example of the type of considerations which can be accommodated by such an expert system. Initial partitioning of the rules can be as simple as the following examples:

(a)
IF vehicle is torpedo AND number of vehicles is one,
THEN execute single torpedo rule section,
ELSE IF vehicle is a torpedo,
THEN execute multiple torpedo rule section.

(b)
IF vehicle is AUV AND number of vehicles is one,
THEN execute single AUV rule section,
ELSE IF vehicle is AUV,
THEN execute multiple AUV rule section.

Once the initial set of rules directs control to the section of rules pertaining to type and number of vehicles, the hierarchical structuring of the individual rules based on the candidate trajectories that were provided by trajectory hypotheses unit 20 is used in the execution of the rules. Examples of this are given by the following sets of rules.

I SINGLE TORPEDO RULE SECTION
(a) CANDIDATE TRAJECTORY: UNMASKING
IF target and weapon bearing separation<B degrees,
THEN increase target and weapon bearing separation,
ELSE interrogate next candidate guidance trajectory.

(b) CANDIDATE TRAJECTORY: INTERCEPT
IF target not alerted AND course and speed quality good,
THEN intercept guidance law,
ELSE interrogate next candidate guidance trajectory.

(c) CANDIDATE TRAJECTORY: OPTIMUM PURSUIT
IF target unalerted AND range quality good AND range error variance<X yards,
THEN optimum pursuit guidance law,
ELSE interrogate next candidate guidance trajectory.

(d) POST ACQUISITION
IF weapon has acquired the contact AND the acquired contact not a target,
THEN disenable vehicle and maintain course. etc.

II MULTIPLE TORPEDO RULE SECTION
(a)
IF single contact AND target unalerted AND salvo,
THEN lead/lag intercept guidance law.

(b)
IF two contacts AND targets unalerted AND salvo,
THEN single torpedo rule section for each contact. etc.

Note that in order to effectively apply a given set of rules, expert system unit 30 must also have information concerning vehicle 202. Accordingly, actual feedback of vehicle information is supplied to unit 30 via vehicle model 206. As a minimum requirement, vehicle position must be made available to unit 30 (e.g. to compute the weapon bearing used in rule I(a)). Other vehicle information (e.g., sensor acoustic contact status used in rule I(d)) is required to provide improved post-acquisition control. Throughout the post-launch guidance phase, the expert system unit 30 is periodically invoked in order to determine what is the latest desired trajectory from the candidate trajectories being provided and the tactical conditions.

The selected trajectory strategy, that is periodically updated, from expert system unit 30 is supplied to vehicle trajectory control commands unit 40 which converts the selected trajectory strategy into a set of vehicle control commands that are interpretable by vehicle 202 as specific orders. Unit 40 comprises an advanced processor 42 and a controller 44. Unit 42 may be a high speed parallel processing unit which is capable of performing real time computations using the measured and estimated data associated with the selected trajectory strategy for every vehicle being employed. One type of processor is disclosed by A.F. Bessacini and R.F. Pinkos in "Supercomputers at Sea: Reality for Submarine Combat Control", Sea Technology, Volume 32, No. 2, February 1991. Accordingly, for each strategy selected by expert system unit 30, advanced processor 42 exercises the guidance law computations that determine the vehicle parameters required to achieve the selected trajectory strategy. In order to accomplish this, unit 42 must contain the guidance law models for all possible system strategies maintained by state machine 26. Since processor 42 computes desired vehicle state based upon current vehicle conditions, actual VEHICLE STATE information (via vehicle model 206) is also provided for computational purposes to processor 42. Included in processor 42 is the predictive capability that projects selected strategies to the vicinity of the contact or desired area and computations of measures of performance (e.g., probability of acquisition, fuel endurance, etc.) for assessment of the selected action. The output of processor 42 is the desired vehicle state vector (in the simplest case, vehicle course) necessary to implement the selected guidance strategy.

Controller 44 contains the mechanisms to generate the vehicle commands to achieve the desired trajectory and to constrain the vehicle from exceeding specific bounds dictated by the tactical encounter. Specifically, controller unit 44 continuously compares the desired vehicle state from processor unit 42 with the actual vehicle state from vehicle model unit 206 to produce the errors from which vehicle commands are generated. These commands are evaluated by a constraining mechanism to ensure the commands to be sent to the vehicle will not result in an updated trajectory that violates tactical or physical limits that are imposed by the current tactical situation (e.g., a course command that would result in a torpedo velocity component in the direction of the launching platform could result in an unsafe situation). The constrained commands are subsequently passed to the vehicle via communication link 204a. Examples of controller's command generation mechanisms are shown in FIGS. 3(a) and 3(b).

Figure 3A:
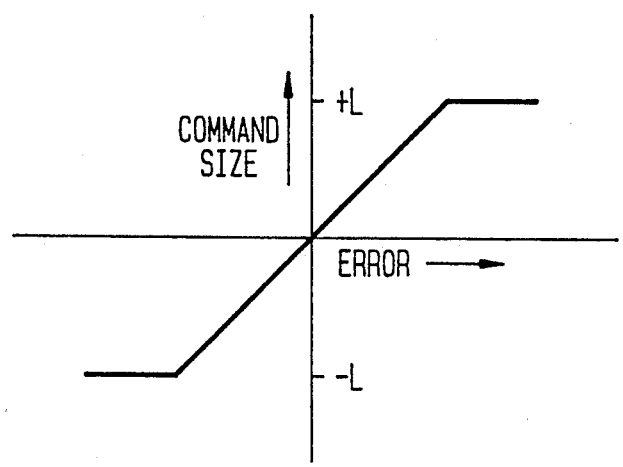
FIGS. 3(a) and 3(b) are representative examples of controllers used by the vehicle trajectory control commands unit of the present invention.
Figure 3B:
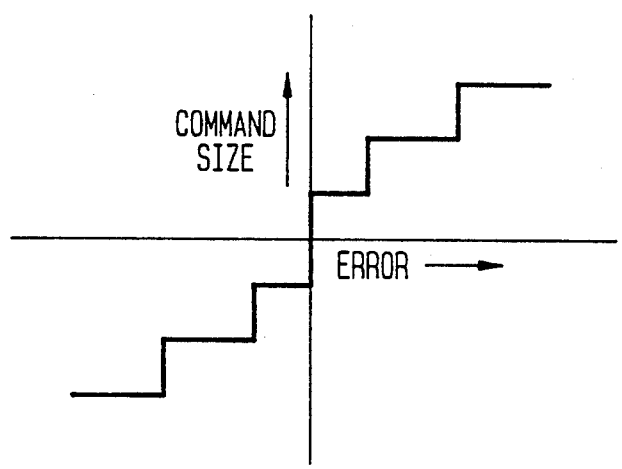

In the command generator of FIG. 3(a), the command sent to vehicle 202 is the same as the computed error. This is suitable for vehicles which can accept any size command up to some specified limit (L). In the controller of FIG. 3(b), the command sent to vehicle 202 is a function of the size of the computed error. This allows for the sending of discrete size commands for vehicles that are limited with respect to command size. In this way, the peculiarities and limitations of vehicles and tactical encounters can be compensated by simply providing a controller that properly transforms the desired vehicle parameters into vehicle control commands interpretable by the particular vehicle.

The advantages of the present invention are numerous. An adaptive trajectory selection apparatus and method is provided for use during the post-launch guidance phase of underwater vehicles. The present invention continuously selects trajectory strategies based upon the changing tactical situation and the available information associated with the ongoing situation. Thus, the present invention will be particularly effective in dealing with contacts performing evasive maneuvers. In addition, a novel feature is the automatic generation of the unmasking trajectory commands that will eliminate interference of the contact measurements by the post-launch vehicle. The present invention automatically and continuously selects the best trajectory strategy for the information (i.e., data and rules) available and automatically generates and issues the necessary vehicle control commands to implement the selected trajectory strategy. This invention provides the system architecture that allows much needed rapid infusion of the latest post-launch tactical strategies and heuristics.

The present invention also provides, through automation, a level of control which places the operator in a supervisory role and simplifies the system, thereby improving operational efficiency. Further, the system of the present invention is readily adaptable to effectively handle multiple contacts and vehicles.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. An adaptive trajectory apparatus for providing vehicle control commands to steer an underwater vehicle launched from a platform towards a contact, comprising:

means for generating a plurality of possible trajectory strategies based upon raw and processed data concerning the contact as measured and processed, respectively, with respect to the platform;

expert system means for periodically selecting one of the possible trajectory strategies based upon a hierarchal structured predetermined set of rules utilizing contact measured data/estimated data and information received from the underwater vehicle, wherein the information received from the underwater vehicle includes at least a position of the underwater vehicle; and means for generating the vehicle control commands using the selected trajectory strategy and the information received from the underwater vehicle.

2. An apparatus as in claim 1 wherein said means for generating the plurality of trajectory strategies, comprises:

means for storing the raw and processed data; and state machine means for generating a plurality of output states in response to the stored data, wherein the output states are indicative of the plurality of possible trajectory strategies.

3. An apparatus as in claim 1 wherein said expert system means, comprises:

means for storing the possible trajectory strategies;

a knowledge base means containing the hierarchal structured predetermined set of rules necessary for determining the selected trajectory from the possible trajectory strategies; and a reasoning mechanism means for inferencing over the set of rules that results in the selected strategy.

4. An apparatus as in claim 1 wherein said means for generating the vehicle control commands, comprises:

processing means, having guidance law models of the possible trajectory strategies provided thereto, for processing the raw and processed data associated with the selected trajectory strategy, wherein said processor means outputs desired vehicle parameters; and controller means for generating the vehicle control commands based on the desired vehicle parameters and the information received from the underwater vehicle.

5. An adaptive trajectory apparatus for providing vehicle control commands to steer an underwater vehicle launched from a platform towards a contact, comprising:

interrogation means for receiving a plurality of measured/estimated parameters associated with the contact, wherein each contact parameter received includes information on the parameter's quality according to predetermined quality standards and a contact alertment status;

means for comparing the received contact parameters with an information matrix that defines a plurality of trajectory strategies and data parameters required to effect each of the trajectory strategies, wherein a trajectory strategy is defined as a candidate trajectory strategy when the required data parameters are included in the received contact parameters;

expert system means for selecting a candidate trajectory strategy based upon a predetermined set of rules that utilize the received contact parameters, quality thereof, contact alertment status and information received from the underwater vehicle, wherein the information received from the underwater vehicle includes at least a position of the underwater vehicle; and means for generating the vehicle control commands using the selected candidate trajectory strategy and the information received from the underwater vehicle.

6. An apparatus according to claim 5 further comprising storage means for storing the received contact parameters for a plurality of contacts.

7. A method for providing vehicle control commands to steer an underwater vehicle launched from a platform towards a contact, comprising the steps of:

receiving a plurality of measured/estimated parameters associated with the contact, wherein each contact parameter received includes information on the parameter's quality according to predetermined quality standards and contact alertment status;

comparing the received contact parameters with an information matrix that defines a plurality of trajectory strategies and data parameters required to effect each of the trajectory strategies, wherein a trajectory strategy is defined as a candidate trajectory strategy when the required data parameters are included in the received contact parameters;

periodically selecting a candidate trajectory strategy based upon a predetermined set of rules that utilize the received contact parameters, quality thereof, contact alertment status and information received from the underwater vehicle, wherein the information received from the underwater vehicle includes at least a position of the underwater vehicle; and generating the vehicle control commands using the selected one candidate trajectory strategy and the information received from the underwater vehicle.

* * * * *